(12) United States Patent
Onozawa et al.

(10) Patent No.: US 8,522,331 B2
(45) Date of Patent: Aug. 27, 2013

(54) COMPUTER READABLE MEDIUM, AUTHENTICATING METHOD, COMPUTER DATA SIGNAL, AUTHENTICATION SERVER, AND SINGLE SIGN-ON AUTHENTICATION SYSTEM

(75) Inventors: Hiroshi Onozawa, Kanagawa (JP); Yutaka Watanabe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1442 days.

(21) Appl. No.: 11/750,467

(22) Filed: May 18, 2007

(65) Prior Publication Data

US 2008/0148376 A1   Jun. 19, 2008

(30) Foreign Application Priority Data

Dec. 19, 2006   (JP) ................. 2006-340712

(51) Int. Cl.
*H04L 29/06*   (2006.01)
(52) U.S. Cl.
USPC .......... 726/8; 726/9; 726/19; 726/23; 726/28; 713/152; 713/186; 705/2; 705/50
(58) Field of Classification Search
USPC ............................................ 726/8; 713/168
See application file for complete search history.

(56) References Cited

U.S. PATENT DOCUMENTS

| 5,828,882 | A | * | 10/1998 | Hinckley | ...................... | 719/318 |
| 6,088,451 | A | * | 7/2000 | He et al. | ........................... | 726/8 |
| 7,392,375 | B2 | * | 6/2008 | Bartram et al. | ................ | 713/152 |
| 7,636,853 | B2 | * | 12/2009 | Cluts et al. | ..................... | 713/186 |
| 2007/0101440 | A1 | * | 5/2007 | Bhatia et al. | .................... | 726/28 |

FOREIGN PATENT DOCUMENTS

JP   2002-335239 A   11/2002

OTHER PUBLICATIONS

Kim et al., A Secure Platform for Peer-to-Peer Computing in the Internet, Jan. 2002, IEEE.*

* cited by examiner

*Primary Examiner* — Taghi Arani
*Assistant Examiner* — Jason Lee
(74) *Attorney, Agent, or Firm* — Sughrue Mion, PLLC (57) ABSTRACT

A computer readable medium storing a program causing a computer to execute a process for authenticating a user in a site included in an authentication system in which a plurality of sites are linked each other, the process comprising: receiving authentication information; authenticating the user in a first site of the authentication system based on the received authentication information; receiving suspicious behavior information of the user; registering the received suspicious behavior information; determining reliability of the user based on the suspicious behavior information registered in registering of the behavior information registration; in a case where the user accesses a second site of the authentication system, adding the reliability of the user determined, and transmitting the authentication information to which the reliability is added to the second site; and determining a function to be provided to the user in the first site based on the reliability of the user.

14 Claims, 10 Drawing Sheets

SITE B: SETTLEMENT SERVICES PROVIDING SITE

| RELIABILITY LEVELS | AVAILABLE SERVICES |
|---|---|
| 10 ~ 9 | ALL THE SERVICES AVAILABLE |
| 8 ~ 5 | ✓ PAYMENT AT THE RECEIPT OF A PRODUCT UNAVAILABLE<br>✓ PAYMENT THROUGH BANK TRANSFER AVAILABLE<br>✓ PAYMENT AFTER RECEIPT OF A PRODUCT UNAVAILABLE<br>✓ PAYMENT THROUGH CREDIT CARD AVAILABLE ONLY WHEN THE USER CAN BE VERIFIED AS A CARD HOLDER IN A DIFFERENT WAY FROM THE NORMAL AUTHENTICATION METHOD |
| 4 ~ 0 | ALL THE SERVICES UNAVAILABLE |

LIST OF SUSPICIOUS BEHAVIORS

| ID | BEHAVIORS | SUSPICIOUS LEVELS |
|---|---|---|
| 1 | ACCESS FROM AN UNUSUAL TERMINAL | 2 |
| 2 | ACCESS IN AN UNUSUAL TIME BAND | 1 |
| 3 | ACCESS FROM A TERMINAL NOT REGISTERED IN ADVANCE | 3 |
| 4 | SIMULTANEOUS ACCESSES FROM DIFFERENT MACHINES | 3 |
| 5 | FREQUENT ERRORS IN ENTERING THE USER ID | 3 |
| 6 | LOGIN FROM THE SAME TERMINAL UNDER DIFFERENT USER IDS | 3 |
| 7 | UNNATURAL ERROR IN ENTERING THE PASSWORD | 3 |
| 8 | ACCESS TO INFORMATION WHICH IS UNDERSTOOD AS NOT BEING ACCESSED NORMALLY;<br>→ACCESS TO FEMALE CONTENTS BY A MALE USER OR VICE VERSA;<br>→ACCESS TO EXPENSIVE PRODUCTS, PRODUCTS AND SERVICES FOR OLDER ADULTS BY A YOUNG USER; | 2 |
| 9 | UNUSUAL DELIVERY ADDRESS | 2 |
| 10 | LOGIN UNDER THE ACCOUNT WHICH HAS BEEN IMPROPERLY USED BEFORE | 2 |
| 11 | LOGIN UNDER THE ACCOUNT WHICH HAS BEEN ACCOUNT LOCKED BEFORE | 2 |
| 12 | LOGIN UNDER THE ACCOUNT WHOSE PASSWORD HAS NOT BEEN CHANGED FOR A LONG PERIOD OF TIME | 1 |
| 13 | LOGIN UNDER THE ACCOUNT WHOSE PASSWORD IS SIMPLE | 1 |

SITE A: ONLINE SHOPPING SITE

| RELIABILITY LEVELS | AVAILABLE SERVICES |
|---|---|
| 10 ~ 4 | ALL SERVICES AVAILABLE |
| 3 ~ 0 | ONLY READING OF PRODUCTS INFORMATION |

FIG. 6

SITE B: SETTLEMENT SERVICES PROVIDING SITE

| RELIABILITY LEVELS | AVAILABLE SERVICES |
|---|---|
| 10 ~ 9 | ALL THE SERVICES AVAILABLE |
| 8 ~ 5 | ✓ PAYMENT AT THE RECEIPT OF A PRODUCT UNAVAILABLE<br>✓ PAYMENT THROUGH BANK TRANSFER AVAILABLE<br>✓ PAYMENT AFTER RECEIPT OF A PRODUCT UNAVAILABLE<br>✓ PAYMENT THROUGH CREDIT CARD AVAILABLE ONLY WHEN THE USER CAN BE VERIFIED AS A CARD HOLDER IN A DIFFERENT WAY FROM THE NORMAL AUTHENTICATION METHOD |
| 4 ~ 0 | ALL THE SERVICES UNAVAILABLE |

COMPUTER READABLE MEDIUM, AUTHENTICATING METHOD, COMPUTER DATA SIGNAL, AUTHENTICATION SERVER, AND SINGLE SIGN-ON AUTHENTICATION SYSTEM

CROSS-REFERENCE TO RELATED APPLICATIONS

This application is based on and claims priority under 35 U.S.C. 119 from Japanese Patent Application No. 2006-340712 filed Dec. 19, 2006.

BACKGROUND

1. Technical Field

The present invention relates to a computer readable medium, to an authenticating method, to a computer data signal, to an authentication server, and to a single sign-on authentication system.

2. Related Art

For example, when a terminal which is connected to a network is used, it is considered that a user is requested to enter his or her user ID and password for authentication thereof, every time the user activates the terminal, connects to a LAN (Local Area Network), connects to a server, and starts an application on the server. As this occurs, while the security is protected, since the user is requested to enter his or her ID and password several times, the convenience enjoyed by the user is damaged.

There is known a system referred to as an SSO (single sign on). The SSO is a system in which the user is allowed to use all permitted functions once he or she is authenticated to the system.

In the SSO authentication system, when a suspicious behavior of the user is detected at a certain site, since there is provided no notification means for notifying other sites of the suspicious behavior so detected, a countermeasure taken against the suspicious behavior so detected at the certain site is limited to the relevant site only.

SUMMARY

According to an aspect of the present invention, a computer readable medium storing a program causing a computer to execute a process for authenticating a user in a site included in an authentication system in which a plurality of sites are linked each other, the process comprising: receiving authentication information; authenticating the user in a first site of the authentication system based on the received authentication information; receiving suspicious behavior information of the user; registering the received suspicious behavior information; determining reliability of the user based on the suspicious behavior information registered in registering of the behavior information registration; in a case where the user accesses a second site of the authentication system, adding the reliability of the user determined in the determining of the reliability to the authentication information received in the authenticating of the user, and transmitting the authentication information to which the reliability is added to the second site; and determining a function to be provided to the user in the first site based on the reliability of the user.

BRIEF DESCRIPTION OF THE DRAWINGS

Exemplary embodiment of the present invention will be described in detail based on the following figures, wherein.

DETAILED DESCRIPTION

Hereinafter, referring to the drawings, an exemplary embodiment of the invention will be described.

Figure 1:
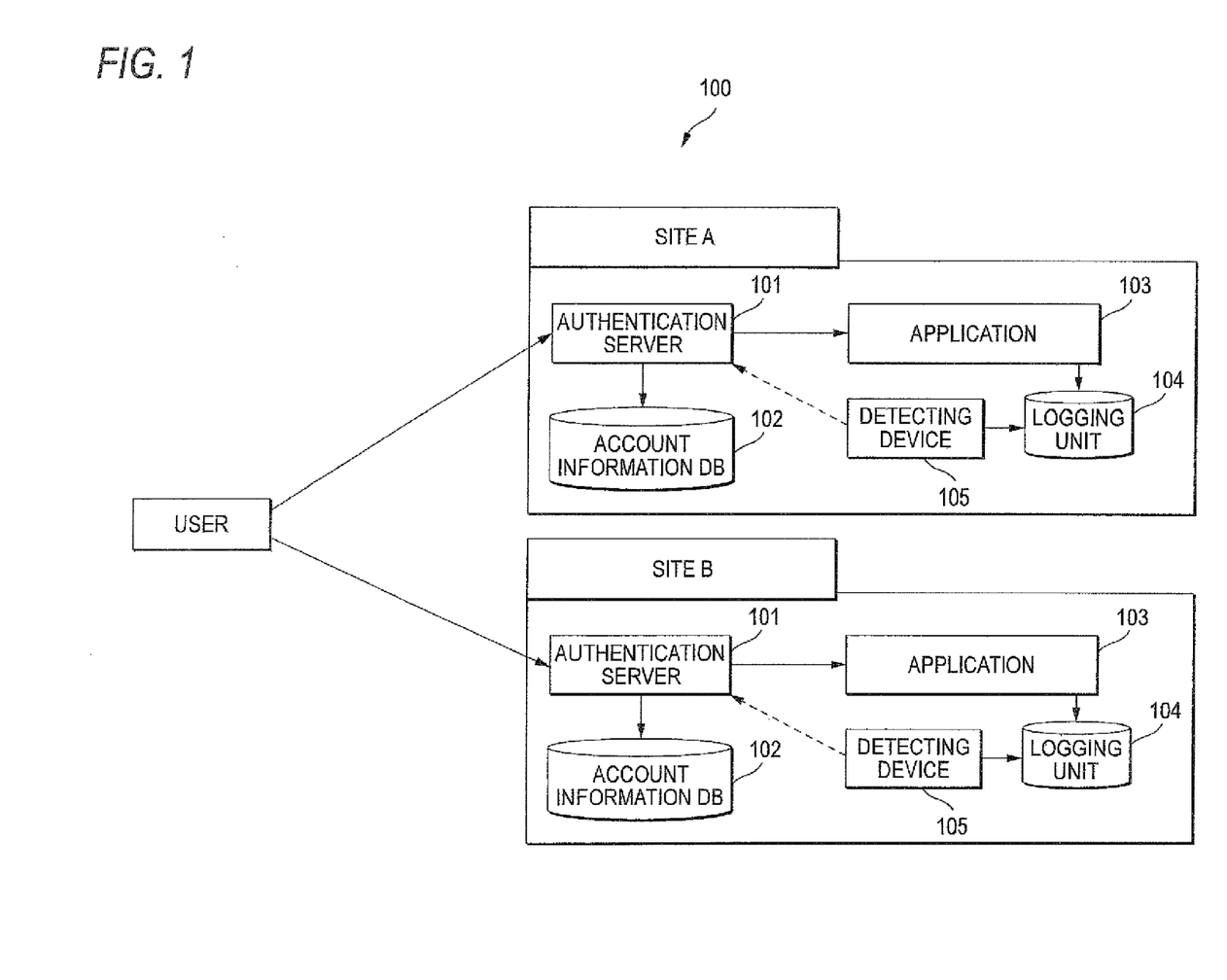
FIG. 1 is a block diagram showing, as an embodiment of the invention, an example of a configuration of a single sign-on authentication system (SSO authentication system) in which a plurality of linked sites do not share an authentication server, and a single sign on is realized by a linked ID control system.

FIG. 1 shows an example of a configuration of a single sign-on authentication system (an SSO authentication system) 100 in which a plurality of linked sites do not share an authentication server and a single sign-on system is realized by a linked ID control system. In this SSO authentication system 100, for the purpose of simplifying the description thereof, a case will be illustrated in which two sites (that is, a site A and a site B) are linked with the system.

Each site includes an authentication server 101, an account information database (an account information DB) 102, an application 103, a logging unit 104, and a detecting device 105. The account information DB 102 is a database for storing account information (user ID, password and other registered information). The application 103 is software which operates at the request of a user to provide a function requested by the user. The logging unit 104 retains a log of executions of or an executing log for the application 103. The detecting device 105 monitors the executing log which is retained in the logging unit 104, detects a suspicious behavior of a user and notifies the authentication server 101 of the suspicious behavior so detected.

Figure 2:
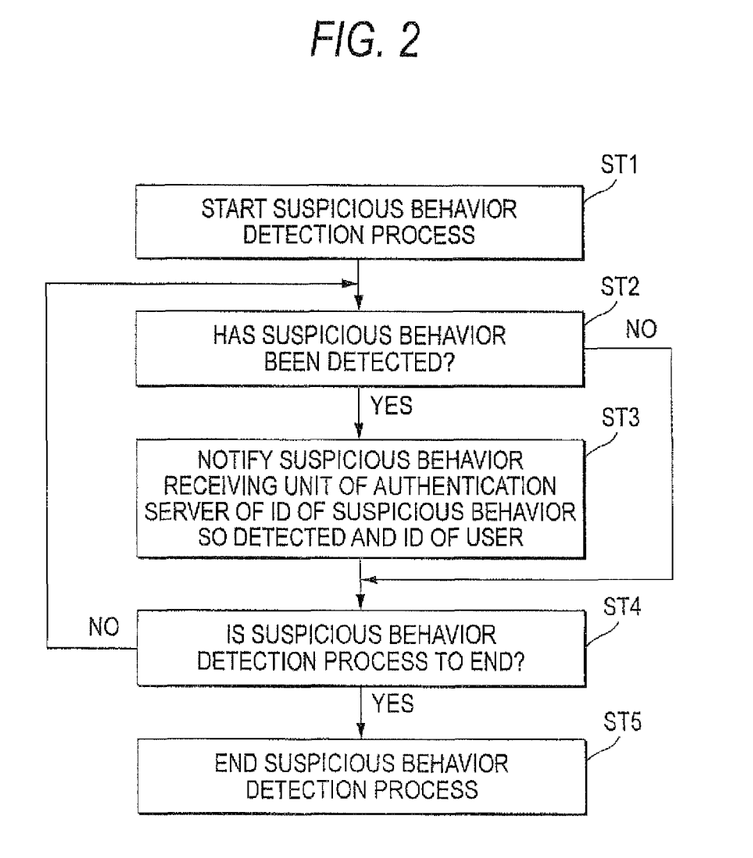
FIG. 2 is a flowchart illustrating an example of a suspicious behavior detection process by a detecting device provided in each site.

A flowchart shown in FIG. 2 illustrates an example of a suspicious behavior detection process in the detecting device 105. The detecting device 105 starts the process in step ST1 where, for example, a user logs in and then proceeds to step ST2. The detecting device 105 determines based on an executing log retained in the logging unit 104 whether or not a suspicious behavior of the user has been detected in step ST2. Suspicious behaviors are defined in advance as shown on a list of suspicious behaviors shown in FIG. 3, for example. In this case, the suspicious behaviors are understood to be common over all linked sites.

Figure 3:
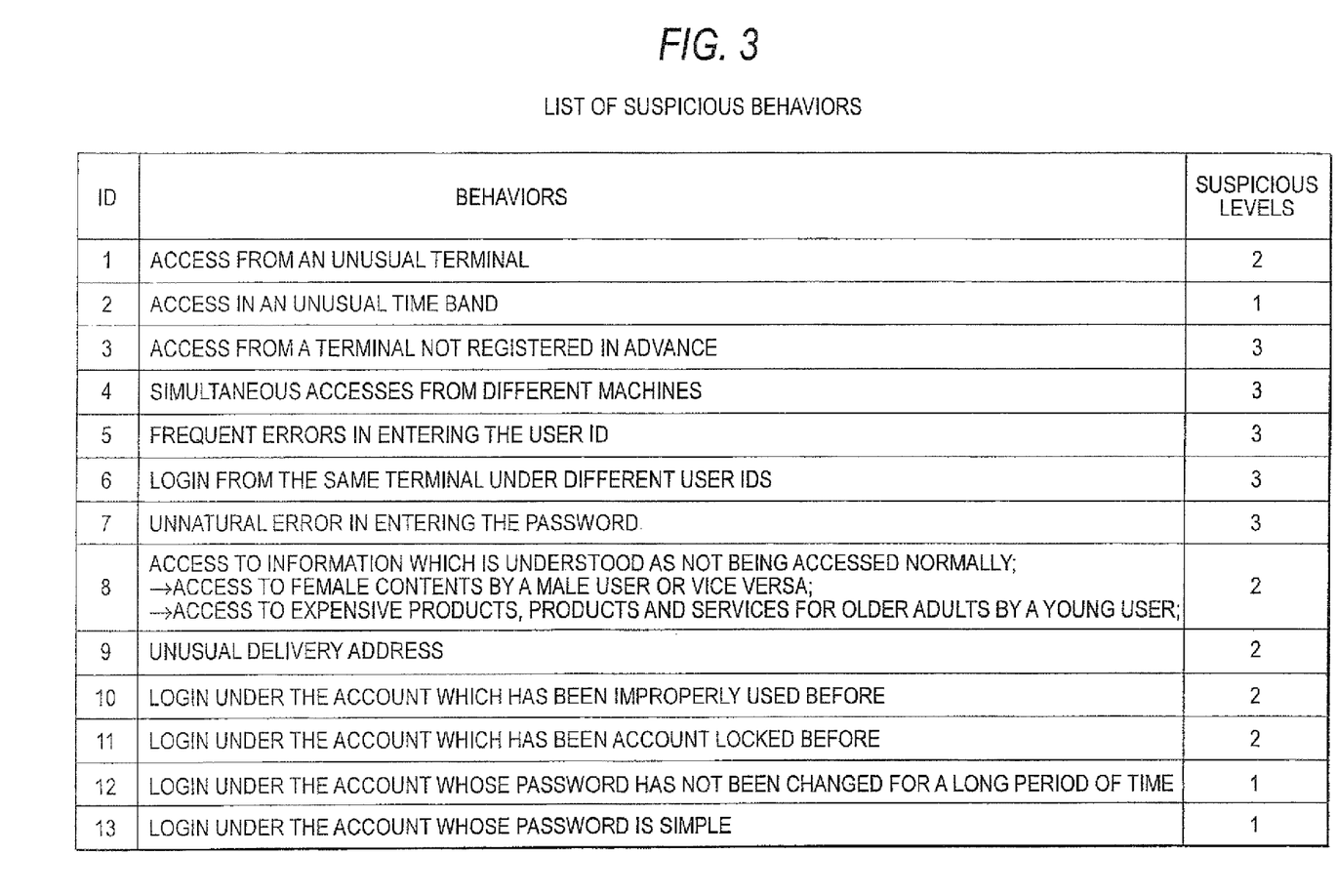
FIG. 3 is a drawing showing a list of suspicious behaviors which are defined in advance.

As the suspicious behaviors, there are raised behaviors such as an "access from an unusual terminal," "access at an unusual time band," "access from a terminal that is not registered in advance," "simultaneous accesses from different machines," and the like. The respective behaviors are identified under IDs, and suspicion levels are individually set for the behaviors.

When the detecting device 105 detects a suspicious behavior in step ST2, the process proceeds to step ST3, where the detecting device 105 notifies a suspicious behavior receiving unit of the authentication server 101, which will be described later on, of the ID of the detected suspicious behavior and the ID of the user who performed the suspicious behavior, and thereafter, the process proceeds to step ST4. If no suspicious behavior is detected in step ST2, the detecting device 105 proceeds directly to step ST4.

The detecting device 105 determines whether or not the suspicious behavior detecting process is to end in step ST4. For example, the detecting device 105 determines to end the process, when the user logs off. When determining not to end the process, the detecting device 105 returns to step ST2, whereas when determining to end the process, the detecting device 105 proceeds to step ST5 to stop the suspicious behavior detecting process.

Figure 4:
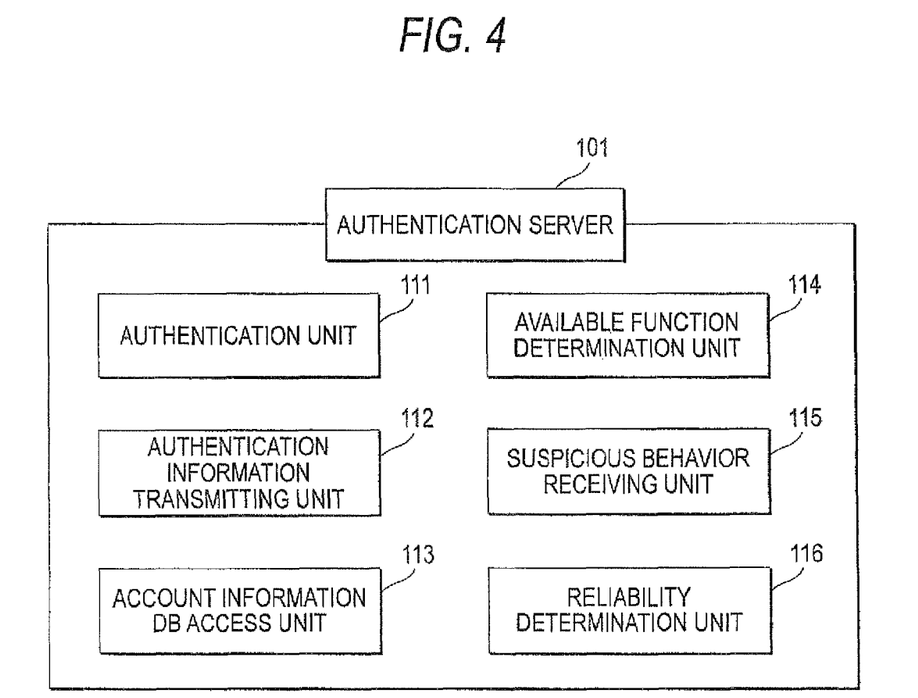
FIG. 4 is a block diagram illustrating an example of functions possessed by an authentication server of each site.

Returning to FIG. 1, for example, as is shown in FIG. 4, the authentication server 101 has functions of an authentication unit 111, an authentication information transmitting unit 112, an account information DB access unit 113, an available function determination unit 114, a suspicious behavior receiving unit 115 and a reliability determination unit 116. As is known, the authentication server 101 is made up of a computer. The authentication server 101 is provided with an authentication program which causes the authentication server 101 to function as the respective functional units.

The authentication unit 111 performs a so-called login process (an authentication process). Namely, the authentication unit 111 receives authentication information (a user ID, password and the like) and authenticates a user based on the authentication information so received and registration information stored in the account information DB 102. Here, the authentication information may be sent from the user's terminal or from a linked other site. When the user first accesses either of the site A and the site B which make up the SSO authentication system 100, the authentication information is sent from the user's terminal to the site which was first accessed by the user. Then, when the user gains access to the other sit, the authentication information is sent from the site which was first accessed by the user to the other site. Namely, the user only has to enter his or her authentication information when he or she gains first access, whereby a single sign on is realized.

In the event that the user accesses one other linked site, the authentication information transmitting unit 112 transmits the authentication information received by the authentication unit 111 as has been described above to the one other linked site. As this occurs, the authentication information transmitting unit 112 adds reliability which is determined in a way that will be described later on by the reliability determination unit 116 to the authentication information for transmission to the one other linked site.

The account information DB access unit 113 reads out registration information that is stored in the account information DB when the authentication unit 111 performs the authentication process, records the reliability that is determined by the reliability determination unit 116 in the account information DB while associating it with the user ID and reads out the reliability stored in the account information DB when the authentication information transmitting unit 112 transmits the authentication information.

The suspicious behavior receiving unit 115 receives the suspicious behavior information (the user ID, the behavior ID) that is notified from the detecting device 105 and registers this suspicious behavior information. The reliability determination unit 116 determines reliability of the user based on the suspicious behavior information of the user that is received and registered by the suspicious behavior receiving unit 115. Here, a reliability level represents a degree or extent to which the user who has logged in does not perform a suspicious behavior. The reliability determination unit 116 calculates a reliability level based on, for example, the following equation (1) using suspicion levels of a user which are set in association with respective behaviors (refer to FIG. 3). Here, the reliability determination unit 116 performs conversion such that as the suspicion level of the user increases, the reliability decreases, whereas as the suspicion level of the user decreases, the reliability increases. Note that in the event that the result of a calculation performed based on the equation (1) is less than 0, the reliability level is regarded 0. The reliability level may be represented, for example, by integers of 0 to 10 in such a way that a higher integer represents higher reliability.

Reliability Level=10−(a total sum of suspicion levels of suspicious behaviors that have been notified since the user has logged in)    (1)

The available function determination unit 114 determines a function that is provided to the user based on the reliability of the user. The available function determination unit 114 uses selectively the reliability that is added to the authentication information that the authentication unit 111 received from another site and the reliability that is determined by the reliability determination unit 116 of the site to which it belongs in a way that will be described later on.

Figure 5:
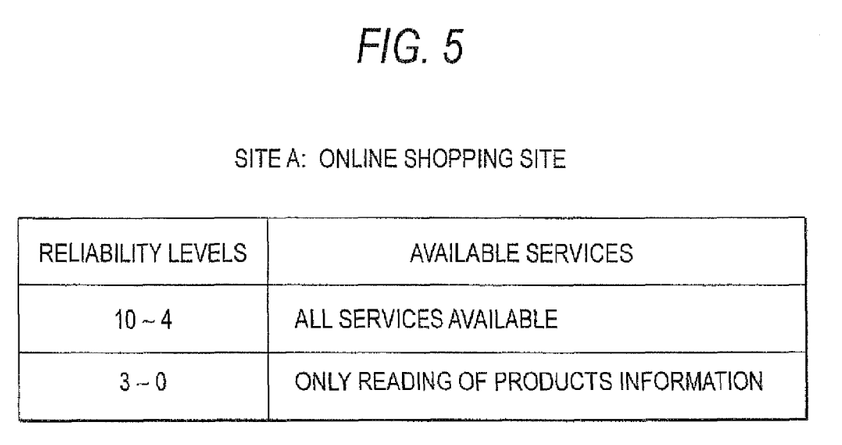
FIG. 5 is a drawing showing an example of a relationship between available functions and reliability levels which is defined in advance in an online shopping site.

Here, functions that are provided by the site and reliability levels at which the functions can be provided are related to each other in advance. FIG. 5 shows one example of a relationship between reliability levels and available functions in the event that the site A is an online shopping site which provides services such as (a) reading products information, (b) receiving purchase requests, (c) referring to past purchase history and the like. With a reliability level of 10 to 4, all the services can be made available to the user, whereas with a reliability of 3 to 0, the user is allowed only to read the products information.

Figure 6:
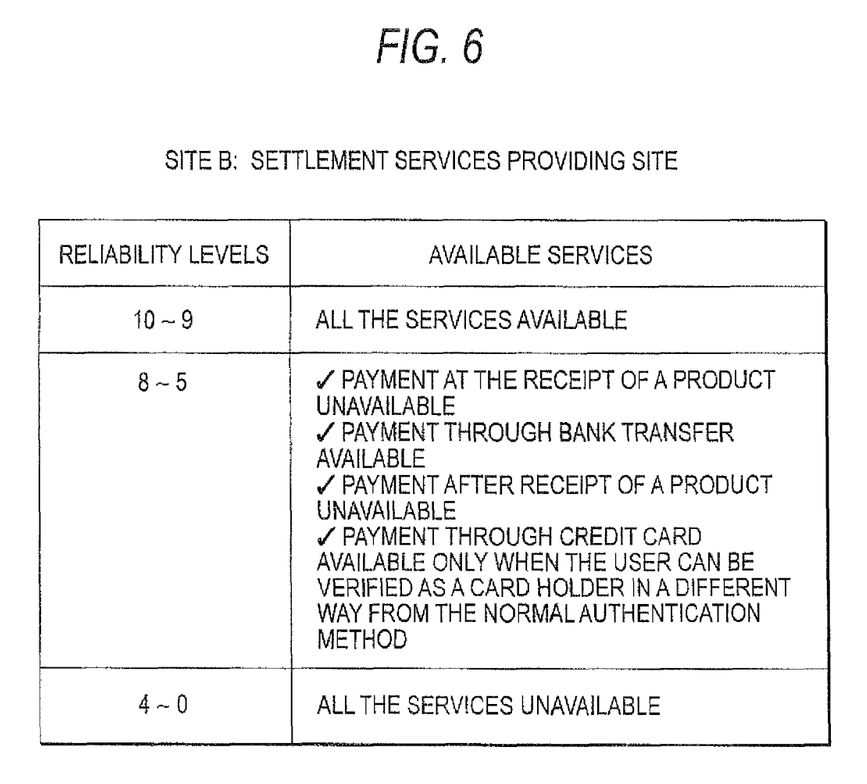
FIG. 6 is a drawing showing an example of a relationship between available functions and reliability levels which is defined in advance in a settlement service providing site.

FIG. 6 shows one example of a relationship between reliability levels and available functions in the event that the site B is a settlement services providing site which provides settlement methods such as (a) payment at the receipt of a product, (b) payment through bank transfer, (c) payment after receipt of a product (at a convenience store or bank), (d) payment by a credit cart and the like. With a reliability of 10 to 9, the user can make use of all the payment methods. With a reliability of 8 to 5, the user cannot use the settlement methods of payment at the receipt of a product and payment after the receipt of a product, and the user is allowed to use his or her credit card for payment only when he or she can be verified as the card holder in a different way. The user can only use the method of payment through bank transfer with this reliability level. With a reliability level of 4 to 0, the user cannot use all the settlement methods.

Figure 7:
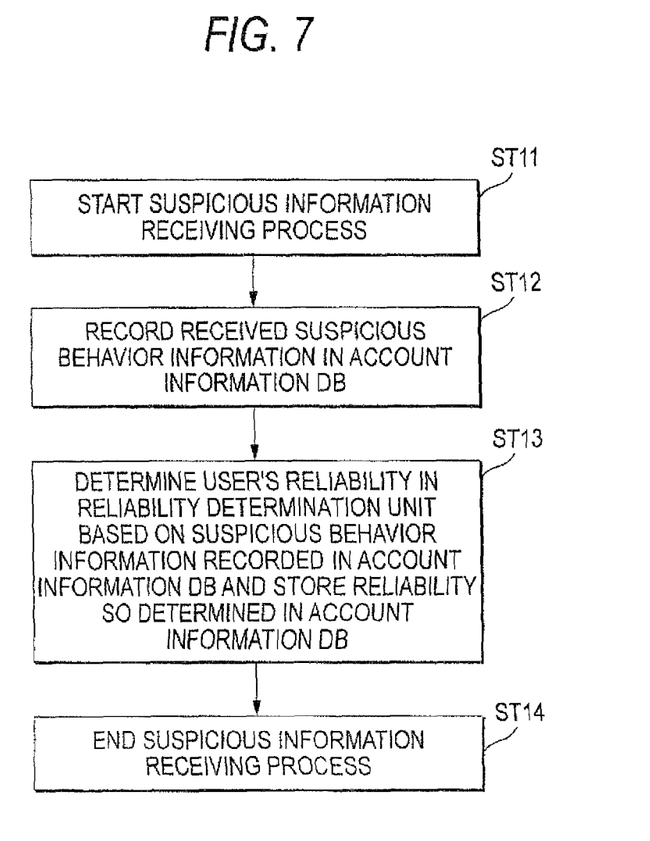
FIG. 7 is a flowchart illustrating an example of a suspicious behavior information receiving process by the authentication server.

A flowchart shown in FIG. 7 represents an example of a suspicious behavior information receiving process in the authentication unit 101. When the suspicious behavior receiving unit 115 receives the suspicious behavior information from the detecting device 105, the authentication server 101 starts the suspicious behavior information receiving process in step ST11 and then proceeds to step ST12. The authentication server 101 has the account information DB access unit 113 record the suspicious behavior information received by the suspicious behavior receiving unit 115 in the account information DB 102.

Next, the authentication server 101 has the reliability determination unit 116 determine the user's reliability (refer to the equation (1), reliability (reliability level)) and has the account information DB access unit 113 record the reliability of the user so determined in the account information DB 102. Then, the authentication server 101 proceeds to step ST14 and ends the suspicious behavior information receiving process.

The authentication server 101 determines the user's reliability (reliability level) by following the flowchart shown in FIG. 7, every time the suspicious behavior receiving unit 115 receives suspicious behavior information from the detecting device 105 and records the determined user's reliability in the account information DB 102. Consequently, the user's reliability (reliability level) that is recorded in the account information DB 102 is updated, every time a suspicious behavior is detected by the detecting device 105.

Figure 8:
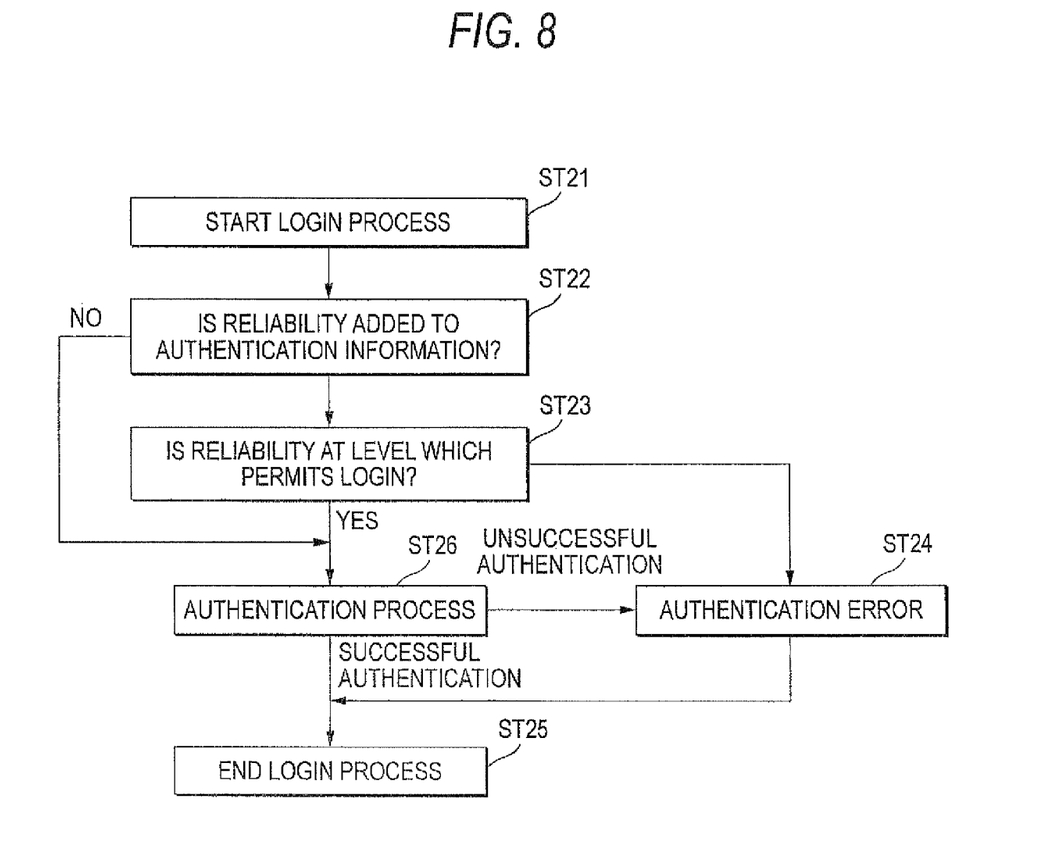
FIG. 8 is a flowchart illustrating an example of a login process by the authentication server.

A flowchart shown in FIG. 8 illustrates an example of a login process in the authentication server 101. When the authentication unit 111 receives the authentication information, the authentication server 101 starts the login process in step ST21 and then proceeds to step ST22. The authentication server 101 determines whether or not the user's reliability (reliability level) is added to the authentication information received by the authentication unit 111 in step ST22. When the authentication server 101 determines that the reliability is so added, the authentication server 101 proceeds to step ST23 and determines whether or not the user's reliability is at a level which permits the login of the user. Note that a level at which the user's login is permitted is set in advance.

When the authentication server 101 determines that the user's reliability is not at the level which permits the user's login in step ST23, the authentication server 101 proceeds to step ST24 to notify the user of an authentication error and then proceeds to step ST25 to ends the login process. On the contrary, when the authentication server 101 determines that the user's reliability is at the level which permits the user's login in step ST23, the authentication server 101 proceeds to step ST26. When the authentication server 101 determines that the user's reliability is not added to the authentication information in step ST22, the authentication server 101 proceeds directly to step ST26.

The authentication server 101 has the authentication unit 11 perform the authentication process of the user based on the authentication information in step ST 26. Then, when the authentication is successful, the authentication server 101 ends the login process in step ST25, whereas when the authentication is unsuccessful, the authentication server 101 informs the user of an authentication error and ends the login process in step ST25.

As has been described heretofore, the authentication server 101 does not perform the authentication process when the user's reliability which is added to the authentication information is not at the level which permits the user to log in. That the reliability is added to the authentication information means that the relevant authentication information is sent from another linked site, and consequently, the login of the suspicious user is prevented based on the suspicious behavior of the user detected at another site.

Figure 9:
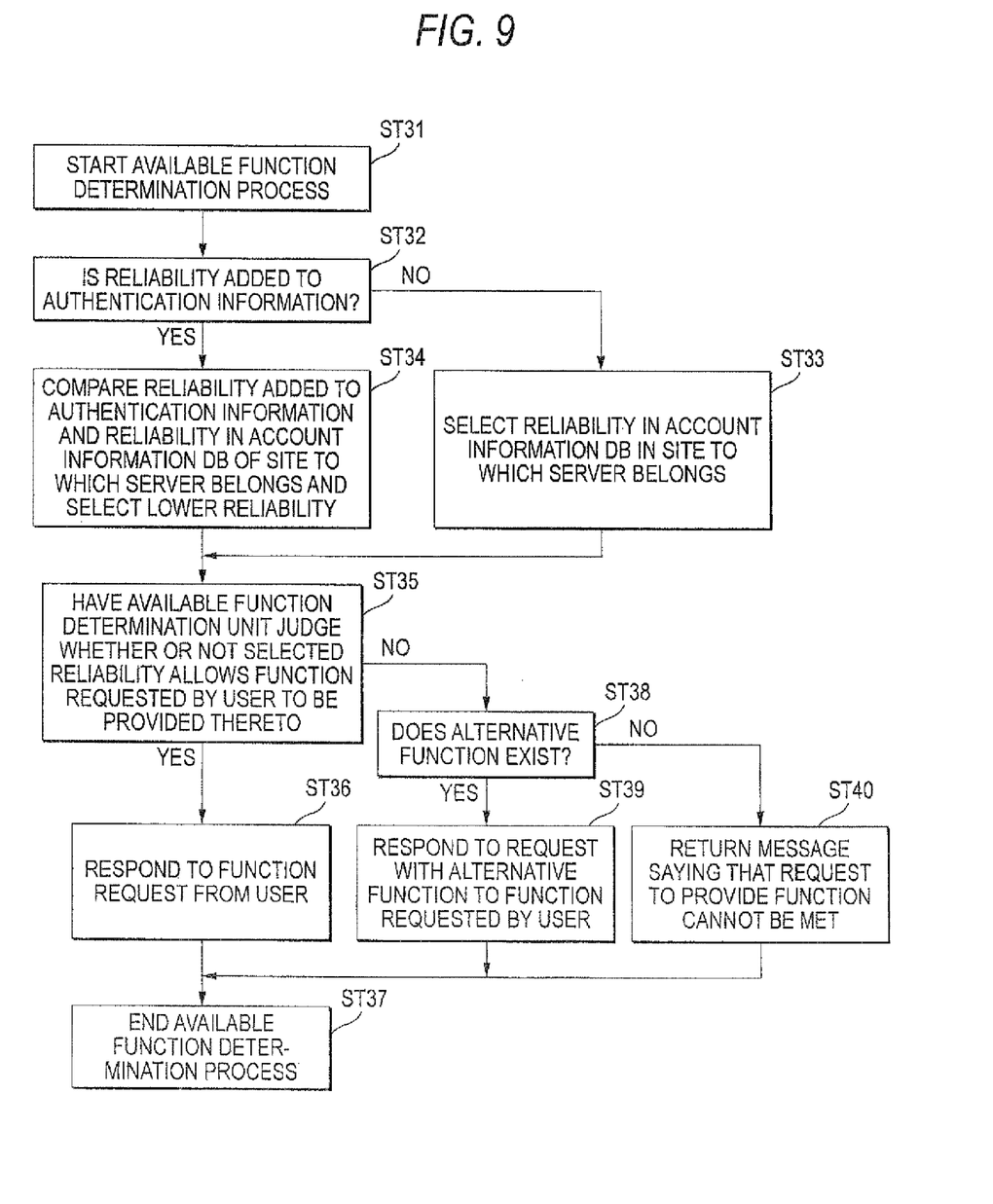
FIG. 9 is a flowchart illustrating an example of an available function determination process by the authentication server.

A flowchart shown in FIG. 9 illustrates an example of an available function determination process in the authentication server 101. When receiving from the user a request to provided him or her with a function, the authentication server 101 starts the available function determination process in step ST31 and then proceeds to step ST32. The authentication server 101 determines in step ST32 whether or not the user's reliability (reliability level) is added to the authentication information.

When the authentication information is such as to be sent from the user's terminal and the user's reliability is not added thereto, the authentication server 101 selects the user's reliability recorded in the account information DB 102 of the site to which it belongs in step ST33 and then proceeds to step ST35. On the other hand, when the authentication information is such as to be sent from the one other site and the user's reliability is added thereto, the authentication server 101 compares the user's reliability that is added to the authentication information with the reliability of the relevant user which is recoded in the authentication information DB 102 of the site to it belongs in step ST34 and selects a lower one of those reliabilities, then proceeding to step ST35.

In step ST35, the authentication server 101 has the available function determination unit 114 judge whether or not for the user's reliability that is selected in step ST33 or step ST34, the function requested by the user is available. The available function determination unit 114 performs this judgment by referring to the relationship (refer to FIGS. 5, 6) between functions provided by the site and reliability levels at which those functions become available.

When the available function determination unit 114 judges that the function requested by the user can be provide to the user with the selected reliability, the authentication server 101 responds to the user with the requested function by the application 103 in step ST36 and then in step ST37 ends the available function determination process. In addition, when the available function determination unit 114 judges that the function requested by the user cannot be provided to the user, the authentication server 101 proceeds to step ST38.

The authentication server 101 determines whether or not an alternative function to the function requested by the user exists in step ST38. Although a specific example is not shown, the alternative function is, for example, a function which is related to the function requested by the user, which can be protected even against a suspicious user and which is set in advance in each site. When such an alternative function exists, the authentication server 101 responds to the user with the alternative function by the application 103 in step ST39 and then ends the available function determination process in step ST37. On the other hand, when there exists no alternative function, the authentication server 101 returns to the user a message saying that the requested function cannot be provided to the user and then ends the available function determination process in step ST37.

As has been described heretofore, the authentication server 101 is such as to judge whether or not the function requested by the user can be provided to the user based on the user's reliability (reliability level) recorded in the account information DB 102 of the site to which it belongs when the user's reliability is not added to the authentication information. Namely, in the event that the user's reliability is not added to the authentication information, the authentication server 101 restricts the provisions of functions to the suspicious user based on the user's reliability held in the site to which it belongs.

In addition, as has been described above, when the user's reliability is added to the authentication information, the authentication server 101 is such as to judge whether or not the function requested by the user can be provided to the user based on the lower reliability of the user's reliability added to the authentication information and the user's information in the account information DB 102 of the site to which it belongs. Namely, the authentication server 101 restricts the provision of functions to the suspicious user by making effective use of the information on the user's reliability from the one other site.

In this case, in the event that a suspicious behavior of the user is detected at the one other site, even in case the suspicious behavior of the user is not detected in the site to which the authentication server 101 belongs, the detection of no suspicious behavior can be deal with based on the reliability added to the authentication information sent from the one other site, thereby making it possible to protect properly the security against the suspicious user.

In addition, as has been described above, when the authentication server 101 judges that the function requested by the user cannot be provide to the user based on the user's reliability, in the event that there exists the alternative function, the authentication serve 101 is such as to responds to the user with the alternative function. This alternative function is, for example, the function which is related to the function requested by the user and which can protect the security even against the suspicious user.

Figure 10:
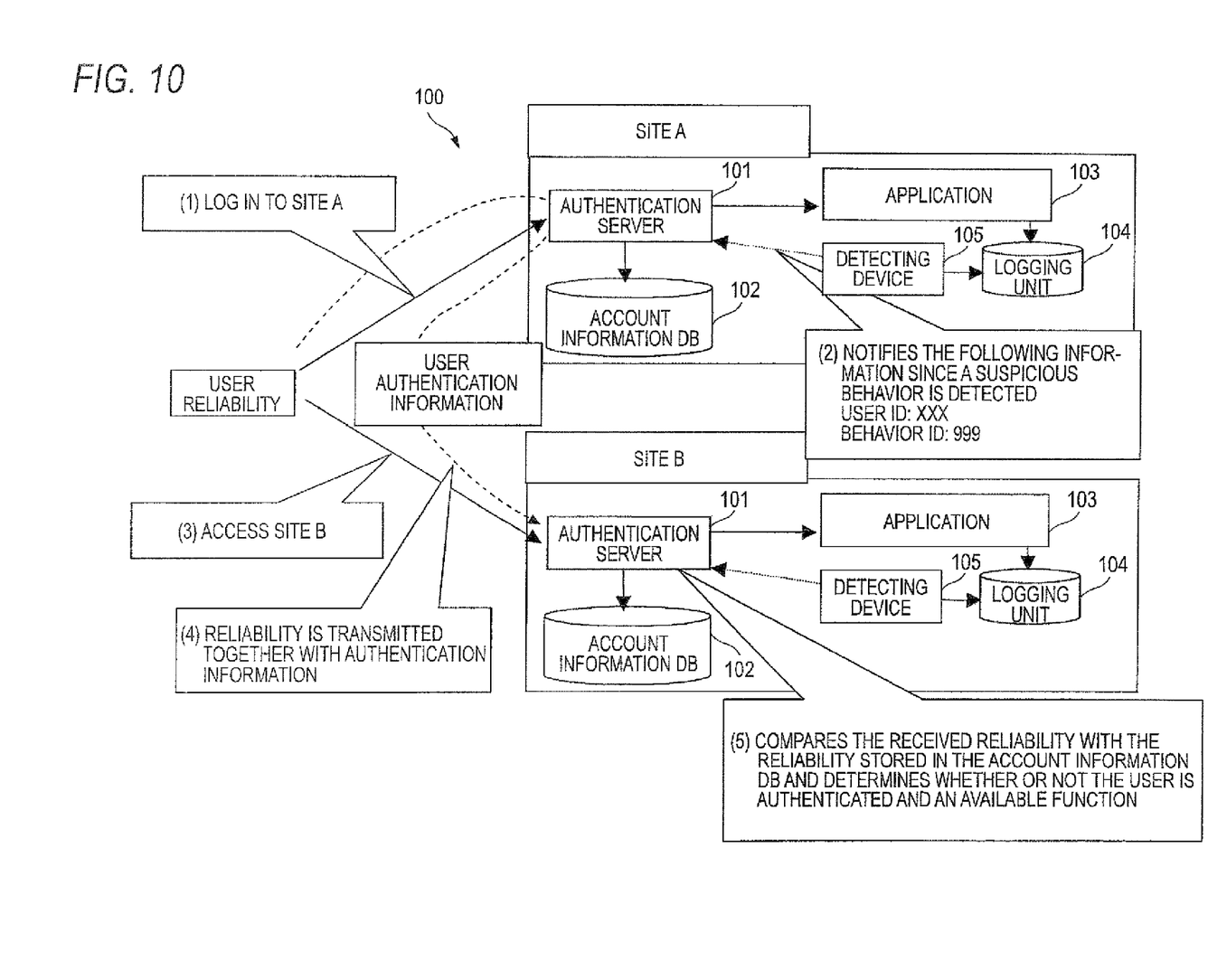
FIG. 10 is a drawing illustrating an example of operations of the SSO authentication system altogether (access by the user to a site A and a site B, authentication of the user when the user gains access, generation of reliability of the user, authentication by the authentication server using the reliability so generated, determination of an available function, and the like).

FIG. 10 shows an example of operations (access by the user to the site A, the site B, authentication of the user when the user accesses the sites, generation of the user's reliability, authentication by the authentication server by the use of the reliability so generated, determination of functions to be provided to the user, and the like) of the SSO authentication system 100 shown in FIG. 1.

(1) The user logs in to (accesses) the site A. When logging in like this, the user inputs his or her authentication information (user ID, password) into the user's terminal and sends it to the authentication server 101 of the site A. The authentication server 101 of the site A authenticates the user based on the authentication information sent from the user's terminal and the registration information stored in the account information DB 102.

When the authentication is successful, the site A becomes ready to receive a request for a function that is available from the site A. When there is a request for a predetermined function from the user, the application 103 of the site A is activated to operate to provide the function requested by the user thereto. A log of executions of the application 103 or an executing log for the application 103 is retained in the logging unit 104. The executing log retained in the logging unit 104 is monitored by the detecting device 105.

(2) When a suspicious behavior of the user is detected, the authentication server 101 is notified of suspicious behavior information (the user ID, the behavior ID) by the detecting device 105 (refer to FIG. 3). Every time suspicious behavior information is given thereto, the authentication server 101 registers the suspicious behavior information, calculates a reliability level based on the equation (1), and records the reliability level so calculated in the account information DB 102.

In the site A, the authentication information received by the authentication server 101 is such as to have been sent from the user's terminal, and the user's reliability (reliability level) is not added to the authentication information. The authentication server 101 judges whether or not a function requested by the user can be so provided based on the user's reliability recorded in the account information DB 102, and when it determines that the requested function can be provided to the user, the authentication server 101 has the application 113 provide the user with the requested function. On the other hand, when it judges that the requested function cannot be so provided, the authentication server 101 provides the alternative function, if such exists, to the user, whereas if no such function exists, the authentication server 101 sends to the user a message saying that the user's request cannot be met.

(3) When having completed the request of function made to the site A, the user accesses the site B which is linked with the site B.

(4) As the access occurs, the authentication server 101 of the site A transmits the authentication information (user ID, password) to an authentication server at the site B in such a state that the user's reliability is added to the relevant information. As this occurs, the user does not have to input his or her authentication information into the user's terminal for transmission to the site B, wherein a single sign on is realized. The authentication server B in the site B performs the authentication of the user based on the authentication information only when the user's reliability is at the level which permits the login of the user. When the user's reliability is not at the level which can permits the user to log in to the site, the authentication server B informs the user of an authentication error.

When the authentication is successful, the site B becomes ready to receive a request for a function that is available from the site B. When there is a request for a predetermined function from the user, the application 103 of the site B is activated to operate to provide the function requested by the user thereto. A log of executions of the application 103 or an executing log for the application 103 is retained in the logging unit 104, and the executing log retained in the logging unit 104 is monitored by the detecting device 105. When a suspicious behavior of the user is detected, the authentication server 101 is notified of suspicious behavior information (user ID, behavior ID) by the detecting device 105. Every time suspicious behavior information is given thereto, the authentication server 101 registers the suspicious behavior information, calculates a reliability level based on the equation (1), and records the reliability level so calculated in the account information DB 102.

The authentication server 101 of the site B judges whether or not the requested function can be so provided based on a lower reliability of the reliability that is added to the authentication information received from the site A and the reliability recorded in the account information DB 102, and when it judges that the requested function can be provided, the authentication server 101 has the application 103 provide the user with the requested function. On the other hand, when it judges that the function requested by the user cannot be provided, the authentication server 101 provides the alternative function to the user, when such exists, whereas when no such alternative function exists, the authentication server 101 transmits to the user a message saying that the user's request cannot be met.

In the SSO authentication system 100, when the user who has exhibited the suspicious behavior at the certain site (for example, the site A) uses the one other site (for example, the site B), since the user's reliability is sent together with the authentication information from the certain site to the one other site, even in the event that the user's suspicious behavior cannot be not detected directly at the one other site, the login of the user and the provision of the function thereto can be restricted based on the reliability sent from the certain site, thereby making it possible to deal duly with the suspicious user. In this case, since the restriction is performed based on the reliability, there occurs no case where the convenience that is to be enjoyed by the user is damaged.

Note that while in the embodiment that has been described heretofore, the SSO authentication system made up of the site A and the site B is illustrated for the purpose of easing the understanding of the description of the embodiment, the invention can similarly be applied to an SSO authentication system which is made up of more linked sites.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A non-transitory computer readable storage medium storing a program causing a computer to execute a process for authenticating a user in a site included in an authentication system in which a plurality of sites are linked to each other, the process comprising:
   receiving authentication information;
   authenticating the user in a first site of the authentication system based on the received authentication information;
   receiving a suspicious behavior notification including suspicious behavior information which denotes that suspicious behavior of the user has been detected;
   registering the received suspicious behavior information;
   determining a reliability level among reliability levels of the user as a function of the registered suspicious behavior information, the reliability level indicating a degree among various degrees of reliability;
   in response to the user accessing a second site of the authentication system, adding the reliability level of the user determined in the determining of the reliability level to the authentication information received in the authenticating of the user, and transmitting the authentication information to which the reliability level is added to the second site; and
   determining a function to be provided to the user in the first site based on the reliability level of the user by providing a first function based on the reliability of the user and not providing a second function based on the reliability level of the user.

2. The non-transitory computer readable storage medium as claimed in claim 1, wherein the authenticating of the user in the first site determines, in response to a reliability level being added to the received authentication information received by the first site, whether or not the reliability level received by the first site is at a level which permits the user's login to the first site, and avoids authenticating in response to the reliability level received by the first site being determined not to be at the level which permits the user's login.

3. The non-transitory computer readable storage medium as claimed in claim 1, wherein the determining of the function determines a function to be provided to the user based on the reliability level determined in the determining of the reliability, in response to the reliability not being added to authentication information received in the receiving of the authentication information.

4. The non-transitory computer readable storage medium as claimed in claim 1, wherein the determining of the function determines, in response to the reliability level being added to authentication information received in the receiving of the authentication information, a function to be provided to the user based on a lower one of the added reliability level and the reliability level that is determined in the determining of the reliability level.

5. The non-transitory computer readable storage medium as claimed in claim 1, wherein in response to the determining of the function determining that a function requested by the user cannot be provided based on the reliability level of the user and in response to an alternative function, which is alternative to the function requested by the user, being available, the determining of the function determines the alternative function as the function to be provided to the user.

6. The non-transitory computer readable storage medium as claimed in claim 1, wherein suspicious behavior of the user which is denoted by the suspicious behavior notification is defined in advance, and at least one of:
   about accessing time;
   about accessing terminal;
   about user ID and password;
   about information to be accessed in a site; and
   about delivery address.

7. The non-transitory computer readable storage medium as claimed in claim 1, wherein the reliability level of the user represents a degree of which the user who has logged in does not perform a suspicious behavior, and is calculated based on suspicion levels which are set in association with suspicious behavior.

8. An authenticating method using a computer for authenticating a user in a site included in an authentication system in which a plurality of sites are linked to each other, the method comprising:
   receiving authentication information by said computer;
   authenticating the user in a first site of the authentication system based on the received authentication information; receiving a suspicious behavior notification including suspicious behavior information which denotes that suspicious behavior of the user has been detected; registering the received suspicious behavior information;
   determining a reliability level of the user as a function of the registered suspicious behavior information, the reliability level indicating a degree among various degrees of reliability;
   in response to the user accessing a second site of the authentication system, adding the reliability level of the user determined in the determining of the reliability level to the authentication information received in the authenticating of the user, and
   transmitting the authentication information to which the reliability level is added to the second site; and
   determining a function to be provided to the user in the first site based on the reliability level of the user by providing a first function based on the reliability of the user and not providing a second function based on the reliability level of the user.

9. An authentication server included in an authentication system in which a plurality of sites linked to each other, the server comprising:
   a central processing unit;

an authentication unit that receives authentication information, and that authenticates a user in a first site of the authentication system based on the received authentication information;

a behavior information registration unit that receives a suspicious behavior notification including suspicious behavior information which denotes that suspicious behavior of the user has been detected, and that registers the received suspicious behavior information;

a reliability level determination unit that determines a reliability level of the user as a function of the registered suspicious behavior information, the reliability level indicating a degree among various degrees of reliability;

an authentication information transmitting unit that, in response to the user accessing a second site, adds the reliability level of the user determined by the reliability level determination unit to the authentication information received by the authentication unit, and that transmits the authentication information to which the reliability level is added to the second site; and an available function determination unit that determines a function to be provided to the user in the first site based on the reliability level of the user by providing a first function based on the reliability of the user and not providing a second function based on the reliability level of the user.

10. A single sign-on authentication system in which a plurality of sites linked to each other realize a single sign-on by a linked ID control system, which comprises an authentication server, wherein the authentication server comprises:

a central processing unit;

an authentication unit that receives authentication information, and that authenticates a user in a first site of the single sign-on authentication system based on the received authentication information;

a behavior information registration unit that receives a suspicious behavior notification including suspicious behavior information which denotes that suspicious behavior of the user has been detected, and that registers the received suspicious behavior information;

a reliability level determination unit that determines a reliability level of the user as a function of the registered suspicious behavior information, the reliability level indicating a degree among various degrees of reliability;

an authentication information transmitting unit that, in response to the user accessing a second site of the single sign-on authentication system, adds the reliability level of the user determined by the reliability level determination unit to the authentication information received by the authentication unit, and that transmits the authentication information to which the reliability level is added to second site; and an available function determination unit that determines a function to be provided to the user in the first site based on the reliability level of the user by providing a first function based on the reliability of the user and not providing a second function based on the reliability level of the user.

11. The non-transitory computer readable storage medium according to claim 1, wherein the determining of the reliability level comprises determining the reliability level of the user by subtracting a suspicious level based on the received suspicious behavior information from a predetermined level.

12. The server according to claim 9, wherein the reliability level determination unit determines the reliability level of the user by subtracting a suspicious level based on the received suspicious behavior information from a predetermined level.

13. The method according to claim 8, wherein the determining of the reliability level comprises determining the reliability level of the user by subtracting a suspicious level based on the received suspicious behavior information from a predetermined level.

14. The system according to claim 10, wherein the determining of the reliability level comprises determining the reliability level of the user by subtracting a suspicious level based on the received suspicious behavior information from a predetermined level.

* * * * *